United States Patent
Roberts et al.

(10) Patent No.: US 9,227,615 B2
(45) Date of Patent: Jan. 5, 2016

(54) METHOD OF DETERMINING USABLE LIFE OF A BRAKE COMPONENT

(71) Applicant: Meritor Heavy Vehicle Breaking Systems (UK) Limited, Cwmbran, Gwent (GB)

(72) Inventors: Paul Roberts, Gwent (GB); Abhishek Mazumdar, Gwent (GB)

(73) Assignee: Meritor Heavy Vehicle Braking Systems (UK) Limited, Cwmbran, Gwent (GB)

( * ) Notice: Subject to any disclaimer, the term of this patent is extended or adjusted under 35 U.S.C. 154(b) by 185 days.

(21) Appl. No.: 13/804,433

(22) Filed: Mar. 14, 2013

(65) Prior Publication Data

US 2013/0261890 A1 Oct. 3, 2013

(30) Foreign Application Priority Data

Mar. 28, 2012 (EP) .................................... 12161704
Mar. 28, 2012 (EP) .................................... 12161705

(51) Int. Cl.
| | |
|---|---|
| *F16D 66/02* | (2006.01) |
| *F16D 65/38* | (2006.01) |
| *F16D 66/00* | (2006.01) |
| *B60T 17/22* | (2006.01) |
| *F16D 65/56* | (2006.01) |

(52) U.S. Cl.
CPC .............. *B60T 17/221* (2013.01); *F16D 65/568* (2013.01); *F16D 66/026* (2013.01); *F16D 66/02* (2013.01); *F16D 2065/386* (2013.01); *F16D 2066/006* (2013.01)

(58) Field of Classification Search
CPC .............. F16D 65/568; F16D 66/026–66/027; F16D 2066/006; F16D 2065/386; F16D 66/02; B60T 17/221; B60T 17/22
USPC .............. 303/1.11 R, 1.11 W, 1.11 L, 1.11 E; 701/36, 48, 67, 68, 78, 83, 29.1–34.4; 181/20
See application file for complete search history.

(56) References Cited

U.S. PATENT DOCUMENTS

| | | |
|---|---|---|
| 5,825,287 A | 10/1998 | Zarybnicky, Sr. et al. |
| 6,279,694 B1 | 8/2001 | Boehm et al. |
| 7,011,186 B2 | 3/2006 | Frentz et al. |

(Continued)

FOREIGN PATENT DOCUMENTS

| | | |
|---|---|---|
| DE | 19536695 A1 | 4/1997 |
| DE | 19730094 A1 | 1/1999 |

(Continued)

OTHER PUBLICATIONS

European Patent Office, Extended Search Report for corresponding European Patent Application No. 12161705.4-2423 mailed Aug. 31, 2012.

(Continued)

*Primary Examiner* — Khoi Tran
*Assistant Examiner* — Abby Lin
(74) *Attorney, Agent, or Firm* — Brooks Kushman P.C.

(57) ABSTRACT

A method of determining if any usable life remains in a brake component of a brake, the method comprising the steps of using a processor to determine a total number of brake events, and using a processor to determine from the total number of brake events if any usable life remains in the brake component.

22 Claims, 4 Drawing Sheets

(56) References Cited

U.S. PATENT DOCUMENTS

| | | |
|---|---|---|
| 2002/0161494 A1 | 10/2002 | Martin |
| 2005/0194836 A1 | 9/2005 | Simpson et al. |
| 2009/0114488 A1* | 5/2009 | Bailey et al. ............ 188/1.11 E |

FOREIGN PATENT DOCUMENTS

| | | |
|---|---|---|
| DE | 102006061656 A1 | 7/2008 |
| EP | 1248010 A2 | 10/2002 |
| EP | 1384638 A2 | 1/2004 |
| EP | 2101077 A1 | 9/2009 |
| JP | 2007147081 A | 6/2007 |

OTHER PUBLICATIONS

European Patent Office, Extended European Search Report for corresponding European Patent Application No. 12161704.7 mailed Aug. 30, 2012.

European Patent Office, Extended European Search Report for the corresponding European Patent Application No. 13158906.1 mailed Sep. 12, 2013.

* cited by examiner

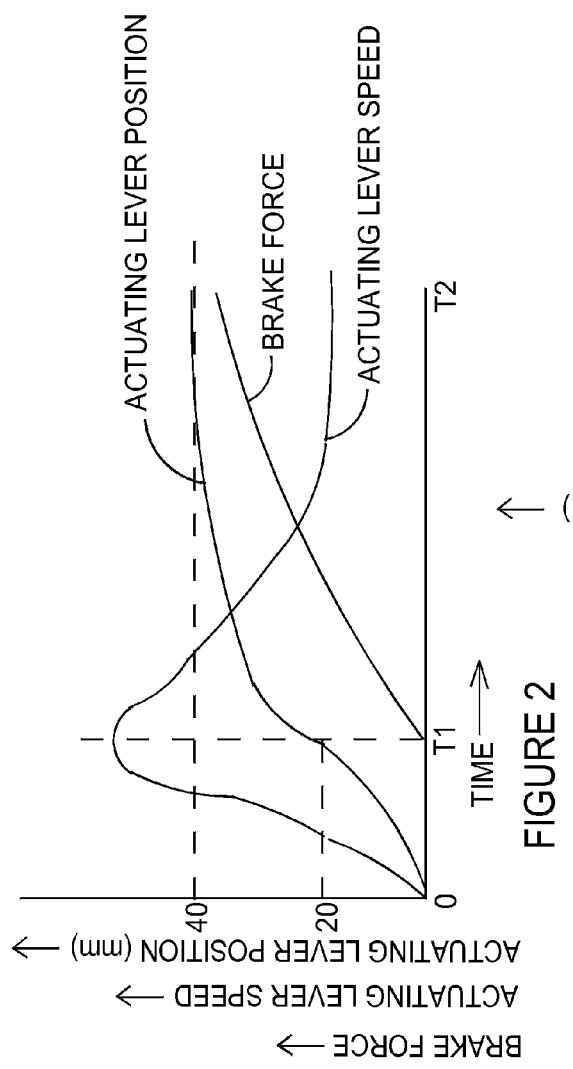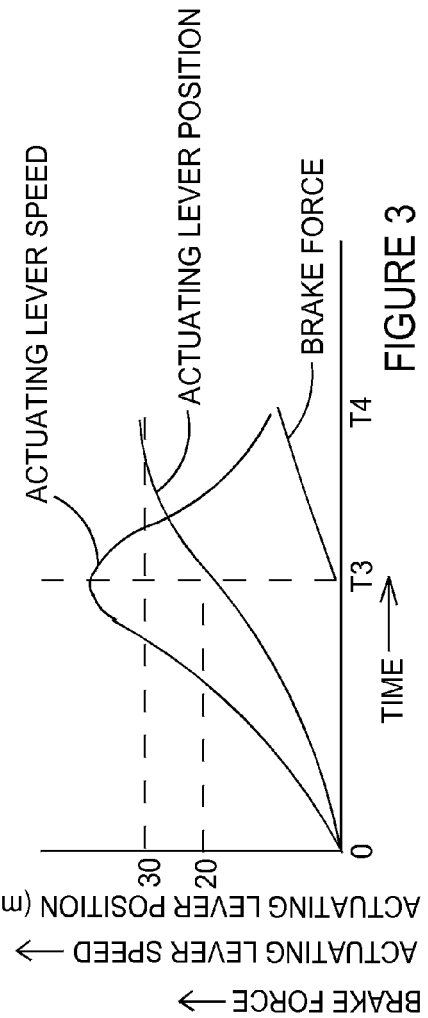

METHOD OF DETERMINING USABLE LIFE OF A BRAKE COMPONENT

TECHNICAL FIELD

The present invention relates to a method of determining if there is any usable life remaining in a brake component.

BACKGROUND

Certain components of brakes have a usable life, following which they must be replaced.

Brake pads and brake shoes include friction material which progressively wears away as the brake is used. Electromechanical wear sensors are known which can determine the amount of friction material wear and provide an indication to an operator that the brake pads or shoes require replacement. EP0877872 shows a sensor which monitors the movement of a brake component which moves in proportion to brake pad wear. The sensor outputs an electrical signal indicative of an amount of brake pad wear. Such a system relies on the progressive movement of the internal brake mechanism.

Also certain components of brakes have a fatigue life. By way of explanation, it is known that certain components made from certain materials (for example steel) to which a load is repeatedly applied and then release can "fatigue" whereby fatigue cracks develop within the component. There comes a point when the fatigue cracks are sufficiently large that the component fails by breaking in two.

Certain components of brakes may have a fatigue life and as such must be replaced before fatigue failure occurs.

Thus there is a need to be able to determine if any usable life remains in a brake component so that it can be replaced.

SUMMARY

Thus, according to one aspect of the present invention there is provided a method of determining if any usable life remains in a brake component of a brake, the method comprising the steps of
   using a processor to determine a total number of brake events,
   using the processor to determine from the total number of brake events if any usable life remains in the brake component.

The method may include the steps of providing an actuator which is operable to apply the brake, and providing an adjuster mechanism which is operable to adjust the running clearance of the brake.

The actuator may be a mechanically operated actuator.

The adjuster mechanism may be electrically operated.

The method may include the steps of allocating to each brake event a value representative of an amount of brake component life used to provide a plurality of values and determining from the plurality of values if any usable life remains in the brake component.

Each brake event may be allocated the same value.

Different braking events may be allocated different values.

The method may include determining from a total number of brake events how much usable life remains in the brake component and/or how much usable life of the brake component has been used.

A processor may be used to determine from the total number of brake events if any usable fatigue life remains in the brake component.

A brake event may be defined by an application of the brake.

A brake event may be defined by an application of the brake above a predetermined limit, preferably the predetermined limit is selected from a predetermined actuating lever rotation, a brake clamp force, a retardation of an associated vehicle, and a brake pedal effort applied by an operator.

A brake event may be defined by a release of the brake.

The brake event may be defined by a release of the brake from above a predetermined limit to below a predetermined limit, preferably the predetermined limit is selected from a predetermined actuating lever rotation, a brake clamp force, a retardation of an associated vehicle, and a brake pedal effort applied by an operator.

The brake may include an electrically operated clearance control system for maintaining a desired running clearance between a rotor and a friction surface of a brake pad or brake shoe,
   the method including the steps of:
   using the processor to determine from the electrically operated clearance control system a total number of brake events.

The brake event may be defined by an adjustment of a running clearance of the brake or a determination that an adjustment of the running clearance of the brake is required.

The brake component may be selected from a brake pad, a brake shoe, a brake rotor.

The brake rotor may be a brakes disc, or a brake drum.

The processor may use a sensor to determine the total number of brake events.

The sensor may be a single sensor.

The sensor may monitor a parameter of a brake component.

The parameter may be a single parameter.

The method may include determining a zero instantaneous running clearance position of a brake including:
   monitoring a parameter of a brake component during use of the brake,
   determining the position of the brake when the parameter has a monitored characteristic that is indicative of a zero instantaneous running clearance position by comparing the monitored characteristic of the parameter with a predetermined characteristic of the parameter which is known to be indicative of a zero instantaneous running clearance position of the brake.

The parameter may be a single parameter.

The monitored parameter may be monitored during a single application and release of the brake.

The monitored parameter may be monitored during a single application of the brake.

The monitored parameter may be monitored during a single release of the brake.

The method may include the steps of monitoring an acceleration of the brake component, and determining a point of maximum deceleration of the brake component to determine when the instantaneous running clearance is zero.

The method may include the steps of monitoring a velocity of the brake component, and determining a point of maximum velocity of the brake component to determine when the instantaneous running clearance is zero.

The method may include the steps of monitoring a velocity of the brake component, and determining a change of velocity of the brake component during release of the brake to determine when the instantaneous running clearance is zero.

The method may include determining a zero instantaneous running clearance position of a brake on a vehicle by:
   monitoring a parameter of a brake component during use of the brake to retard or slow the vehicle,
   determining the position of the brake when the parameter has a monitored characteristic that is indicative of a zero instantaneous running clearance position by comparing the monitored characteristic of the parameter with a predetermined characteristic of the parameter which is known to be indicative of a zero instantaneous running clearance position of the brake.

The parameter may be a single parameter.

The method may include adjusting an actual running clearance of a brake by:
   determining a zero instantaneous running clearance position of a brake,
   determining from the zero instantaneous running clearance positions of the brake an actual running clearance of the brake,
   providing a desired running clearance of the brake, and
   adjusting the brake such that a subsequent actual running clearance of the brake is nearer the desired running clearance of the brake.

The actual running clearance may be greater than said desired running clearance and said subsequent actual running clearance may be less than said actual running clearance.

The actual running clearance may be less than said desired running clearance and said subsequent actual running clearance is greater than said actual running clearance.

The method may include using the processor to compare the monitored characteristic of the parameter with the predetermined characteristic of the parameter.

According to one aspect of the present invention there is provided a brake arrangement including a processor configured to determine if any usable life remains in a brake component of the brake arrangement by:
   using the processor to determine a total number of brake events,
   using the processor to determine from the total number of brake events if any usable life remains in the brake component.

The brake arrangement may include a sensor in which the processor uses the sensor to determine a total number of brake events.

The sensor may be a single sensor.

The sensor may monitor a single parameter of a brake component.

The brake arrangement may be configured to determine a zero instantaneous running clearance position of a brake by:
   monitoring a parameter of a brake component during use of the brake,
   determining the position of the brake when the parameter has a monitored characteristic that is indicative of a zero instantaneous running clearance position by comparing the monitored characteristic of the parameter with a predetermined characteristic of the parameter which is known to be indicative of a zero instantaneous running clearance position of the brake.

The parameter may be a single parameter.

The brake arrangement may be configured to adjust an actual running clearance of a brake by:
   determining a zero instantaneous running clearance position of the brake,
   determining from the zero instantaneous running clearance positions of the brake an actual running clearance of the brake,
   providing a desired running clearance of the brake, and
   adjusting the brake such that a subsequent actual running clearance of the brake is nearer the desired running clearance of the brake.

The brake may be a service brake.

BRIEF DESCRIPTION OF THE DRAWINGS

The invention will now be described followed by way of example only, with reference to the accompanying drawings in which:

FIGS. 2 and 3 show how the brake force, actuating lever speed and actuating lever position of the brake of FIG. 1 vary with time during a brake application.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIGS. 1 to 4 and the following description thereof describe a method of determining a zero instantaneous running clearance position of a brake.

In this case the brake 12 is a service brake, i.e. a brake that is used to slow the vehicle down. The brake 12 may also be used as a parking brake, i.e. a brake used when the vehicle is stationary to prevent the vehicle moving.

Figure 1:
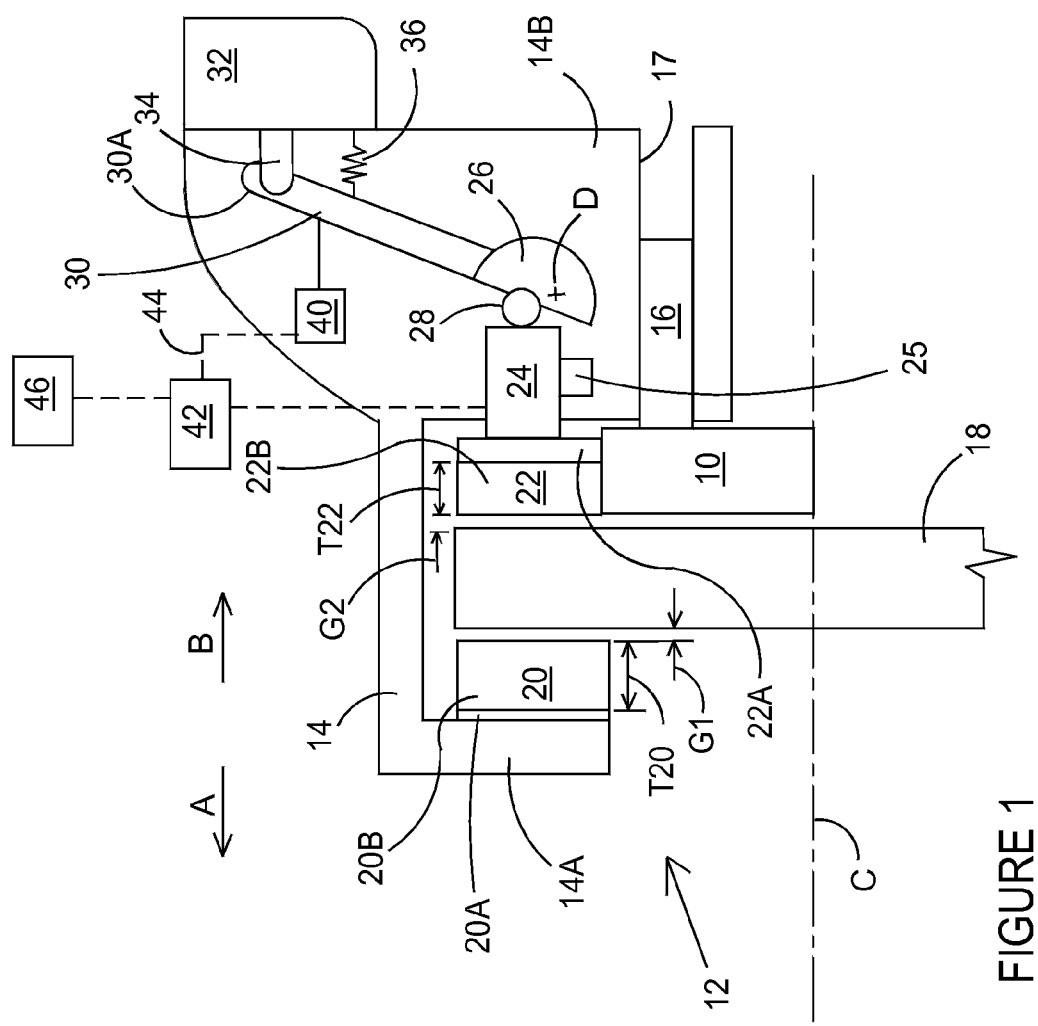
FIG. 1 shows a schematic view of a brake according to the present invention.

With reference to FIG. 1 there is shown a vehicle 10 having a brake 12. The brake 12 includes a caliper 14 which is slidably mounted via pin 16 on the vehicle 10, typically on a suspension component of the vehicle 10. Accordingly the caliper 14 can move in the direction of arrow A and in the direction of arrow B.

The vehicle 10 includes a brake rotor, in this case a brake disc 18 which is rotatably mounted about axis C. The brake disc 18 is rotatably fast with a wheel (not shown) which also rotates about axis C.

Brake pad 20 includes a brake pad back plate 20A and friction material 20B. Brake pad 22 includes a brake pad back plate 22A and friction material 22B.

On opposite axial sides of the brake disc there are brake pads 20 and 22. Adjacent brake pad 22 is an adjuster mechanism 24. An actuation shaft (or operating shaft) 26 is mounted in the caliper 14 and is rotatable about axis D. A roller 28 is supported on the actuation shaft 26 and engages a right hand end (when viewing FIG. 1) of the adjuster mechanism 24.

Operating lever 30 is attached to the actuating shaft 26. An actuator 32 is mounted on the caliper 14, and includes an actuator rod 34, which engages an end 30A of the actuating lever 30.

The actuator 32 is a mechanically operated actuator, in this case an air operated actuator. The actuator 32 may not be an electrically operated actuator.

As shown in FIG. 1 the brakes are in a released condition, actuating lever 30 having being rotated clockwise about axis D such that a gap G1 exists between brake pad 20 and brake disc 18 and a gap G2 exists between brake pad 22 and brake disc 18. Accordingly, the released running clearance is G1+G2.

In order to apply the brakes the actuator 32 is operated such that the actuator rod extends from the actuator and moves in a direction of arrow A thereby rotating the operating shaft 26 anti-clockwise about axis D. Because the roller 28 is offset from axis D, the roller 28 moves in the direction of arrow A which causes the adjustment mechanism 24 to move in a direction of A which forces the brake pad 22 in the direction of arrow A, thereby closing the gap G2. Continued anticlockwise rotation of the operating shaft 26 then causes the caliper 14 to move in the direction of arrow B as the hole 17 in the caliper slides on pin 16. This causes gap G1 to close. At this point the instantaneous running clearance is zero but, because the brake pads are not being forced against the brake disc 18, no braking force exists to retard to slow the vehicle. Only when the actuator 32 continues to move the actuator rod 34 in the direction of arrow A, does a clamping force of the brake pads on the discs start to be generated. The clamping (or braking) force is dependent upon, amongst other things, the force in the actuating rod 34, a higher force actuating rod 34 resulting in a higher clamping force and therefore a higher retardation of the vehicle. As the force in actuator rod 34 increases, the elasticity in the various brake components allows for the actuator rod to continue to extend from the actuator and continue to move in the direction of arrow A relative to the actuator, in spite of the fact that the brake pads 20 and 22 are in engagement with the brake disc 18. By way of example, if the brake force is increased, the caliper 14 will start to deflect with the side 14a progressively moving further away from side 14b. Clearly other brake components will deflect as the brake force increases.

By way of example, if the released running clearance as shown in FIG. 1 is 1 mm (e.g. G1=0.5 mm and G2=0.5 mm) and the operating ratio of the operating shaft 26 is approximately 20:1, (i.e. every 20 mm end 30A moves in the direction of arrow A, roller 28 moves 1 mm in the direction of arrow A), then to reduce the instantaneous running clearance to zero requires end 30A to move 20 mm in the direction of arrow A. However, at this point the brakes are not applied. In order to apply the brake end 30A must continue to be moved in the direction of arrow A relative to the actuator 32 and, by way of example, for the brake to be applied relatively heavy, end 30A must extend a further 20 mm, i.e. a total of 40 mm. This 40 mm movement of end 30A causes a roller 28 to "move" total of 2 mm, 1 mm of which closes gaps G1 and G2 and the other 1 mm of which is absorbed in the elasticity of the various components.

The adjuster mechanism 24 is electrically operated by electric motor 25. Thus the adjuster mechanism 24 can be extended (or lengthened) (such that end 24A moves away from end 24B) or retracted (or shortened) (such that end 24A moves towards end 24B) by operation of the electric motor 25. It will be appreciated that by extending the adjuster mechanism 24 the released running clearance will reduce and by retracting (or shortening) the adjuster mechanism 24 the released running clearance will increase.

As will be appreciated, the adjuster mechanism 24 is a distinct component from the actuator 32. The actuator 32 performs the function of applying and releasing the brake. The adjuster mechanism 24 performs the function of adjusting (in particular the running clearance) of the brake. The adjuster mechanism is not used to apply the brake. The actuator mechanism is not used to adjust the running clearance of the brake. The actuator 32 is an air operated actuator though other types of mechanical actuator may be used. The adjuster mechanism 24 is electrically operated, i.e. in order to adjust the adjuster mechanism the electric motor 25 must be operated.

The vehicle 10 includes a sensor 40 and a processor 42, in one embodiment a microprocessor. There is also included a memory 46 such as data storage, such as flash memory.

The sensor 40 in this case is a position sensor and senses the position of the actuating lever 30. The sensor 40 together with the processor 42 and memory 44 can be used to determine the rest position of the actuating lever 30 (as shown in FIG. 1) and can also be used to determine when the instantaneous running clearance has reduced to zero (but the brakes are not applied).

Consider the situation where the vehicle operator applies the brakes heavily. Using the example above, the actuator rod 34 will have moved 40 mm in the direction of arrow A. During the first 20 mm of movement all that occurs is that gap G2 closes and the caliper moves in the direction of arrow B such that gap G1 closes. At this moment, no braking force has yet been applied since the force required to, for example, slide the hole 17 along pin 16 is relatively low and thus the actuator rod 34 moves relatively quickly during its first 20 mm of movement. However, during the second 20 mm of "extension" of rod 34 the clamping force progressively increases and therefore the force required to move end 30A through the final 20 mm of movement increases considerably. This results in the actuator rod 34 extending more slowly over the second 20 mm of movement than over the first 20 mm of movement. By utilizing the sensor 40 to monitor the position of the actuating lever as the brake is applied, it is possible to determine when the instantaneous running clearance reduces to zero. The sensor 40 can also determine the rest position of the actuating lever 30. Knowing the rest position of the actuator lever 30 and the position of the actuating lever 30 when the instantaneous running clearance is zero enables the released running clearance to be determined.

In more detail, with reference to FIG. 2 there is shown the position of the end 30A of the actuating lever 30 plotted against time as the vehicle operator demands a heavy braking force. The actuating lever position is sensed by sensor 40. Also shown on FIG. 2 is the actuating lever speed over the same time period and the brake clamp force over the same time period.

At time T0 the actuating lever is positioned as shown in FIG. 1 in the rest condition. This is taken as zero displacement. Because there is an air gap G1, G2, then the brake force is zero. The actuating lever is stationary, and the actuating lever speed is zero.

As time T0 the vehicle operator applies the brakes which causes the actuator 32 to move the actuator rod 34 in the direction of arrow A. The characteristics of the brake are such that the end 30A of the actuating lever moves as shown on FIG. 2. Since the actuating lever position with respect to time is known, then it is possible to determine the actuating lever speed with respect to time. This has been plotted on FIG. 2. Significantly at time T1 the actuating lever speed has reached a maximum, following which the speed decreases. This maximum speed coincides with the moment when the instantaneous running clearance has reduced to zero. Immediately after this time a clamping force begins to be generated which tends to slow down the speed of actuating lever. At time T2 the actuator rod 34 has extended 40 mm and the actuating lever speed is relatively slower when compared with the peak at time T1. At time T2 the brake force is relatively high.

With reference to FIG. 3 there is shown a plot of actuating lever speed, actuating lever position, and brake force with respect to time wherein the vehicle operator has applied the brake relatively slowly and relatively lightly. Under these circumstances it has taken time T3 for the instantaneous running clearance to close to zero. It will be appreciated that the brake has been applied relatively lightly since the maximum displacement of the actuator rod 34 is only 30 mm at time T4. Nevertheless, it will be appreciated that FIG. 3 shows similar characteristics, namely that at the point of maximum lever speed, the instantaneous running clearance has reduced to zero. After this time a clamp force starts to be generated.

Thus, when a new brake has been designed, it may be fitted to a test vehicle and fitted with various instrumentation including, for example, a position sensor monitoring the position of a particular component of the brake assembly, and also a force sensor to measure the clamping force for the caliper. The test vehicle will then be driven and braked under various circumstances. Analysis of the data may show that at or near the zero instantaneous running clearance position of the brake component (as determined by the force sensor), the measured parameter may have a particular characteristic. In the example above, the measured parameter was velocity and the characteristic of the velocity that the point when the brake reached a zero instantaneous running clearance was a peak in the velocity. Understanding how a particular characteristic of a measured parameter relates to a zero instantaneous running clearance position of the brake allows subsequent vehicles (such as production vehicles) which monitor the same parameter, but which do not include a force sensor, be able to determine the zero instantaneous running clearance position of the brake from the measured parameter alone.

In the example above, a peak in the velocity profile of component 30 is a characteristic of the parameter (velocity) which is known (as a result of testing) to be indicative of a zero instantaneous running clearance position of the brake. Subsequent vehicles (such as production vehicles) fitted with a similar brake and with sensor 40, but without any force sensor can determine the zero instantaneous running clearance position of the brake by determining the position of the brake when the parameter (velocity of component 30) has a characteristic (a velocity peak) that is indicative of a zero instantaneous running clearance. This can be carried out by comparing the monitored (or measured) velocity peak with the predetermined characteristic (as measured on the test vehicle). If the measured velocity peak is of a similar profile to the predetermined velocity peak, then the system can determine that the measured velocity peak is indeed indicative of a zero instantaneous running clearance position of the brake. However, under other circumstances, a velocity peak may be produced which is not indicative of zero instantaneous running clearance position of the brake. Under these circumstances the velocity peak can be compared with the predetermined velocity peaks and where they are not sufficiently similar the system can determine that the measured velocity peak was not indicative of a zero instantaneous running clearance position of the brake and therefore ignore this particular velocity peak for the purposes of running clearance adjustment.

As will be appreciated, since it is possible to determine the point of zero instantaneous running clearance by monitoring a single parameter of the brake, only one sensor is required.

Once it is possible to determine the point of zero instantaneous running clearance then it is possible to determine an actual released running clearance. If that actual released running clearance differs from a desired running clearance, then the adjustment mechanism can be adjusted (either by being lengthened or shortened) in order to adjust the actual released running clearance to the desired released running clearance.

As will be appreciated, if wear of friction material has taken place then the adjustment mechanism can be adjusted by being lengthened to compensate for the wear. Alternatively if the brake has become hot through use, then under these circumstances the actual running clearance may decrease. As such, the adjustment mechanism can be adjusted by being shortened in order to increase the actual running clearance to nearer the desired running clearance. Clearly once the brake has cooled, then the adjustment mechanism can again be adjusted by being lengthened to compensate for the now cool brake.

As mentioned above, when the brake is applied, a peak velocity of end 30A coincides with a zero instantaneous running clearance condition. A zero instantaneous running clearance condition can also be determined during brake release. Thus, consider the situation where the brake has been applied relatively heavily. Brake components are under considerable load and they will have elastically deformed. Upon release of the brake, the stored elastic energy in the caliper etc is released and the brake releases to a zero instantaneous running clearance condition relatively quickly. Once at the zero instantaneous running clearance condition, the only forces acting on the actuating lever 30 are relatively light return spring forces designed into the brake to return the actuating lever 30 to the position shown in FIG. 1. Tension spring 36 is a diagrammatical representation of a return spring. Thus, a sudden reduction in the speed of the actuating lever 30 substantially coincides with the point at which the instantaneous running clearance is zero and no braking force.

Figure 4:
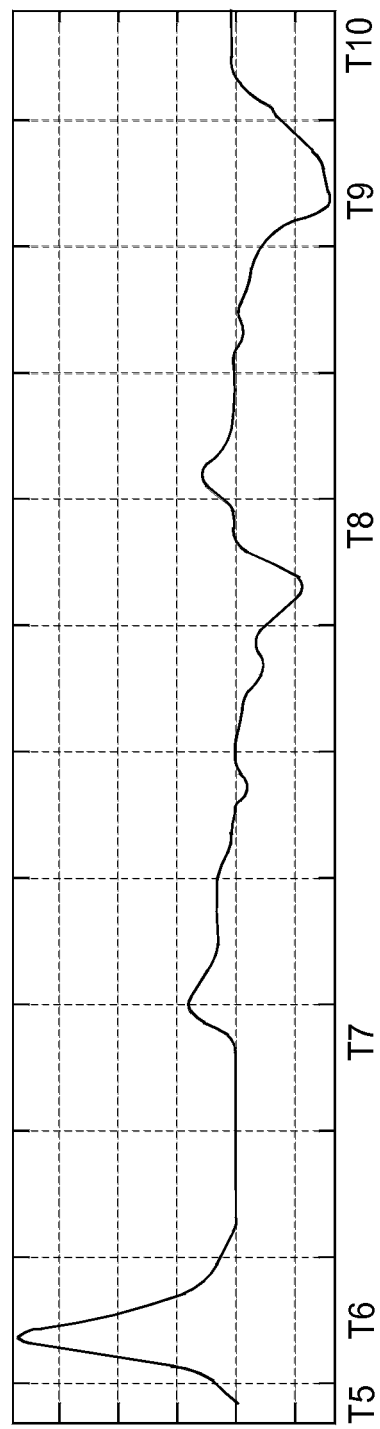
FIG. 4 shows how the actuating lever speed of the brake of FIG. 1 varies with time during a brake application and subsequent release.
Figure 5:
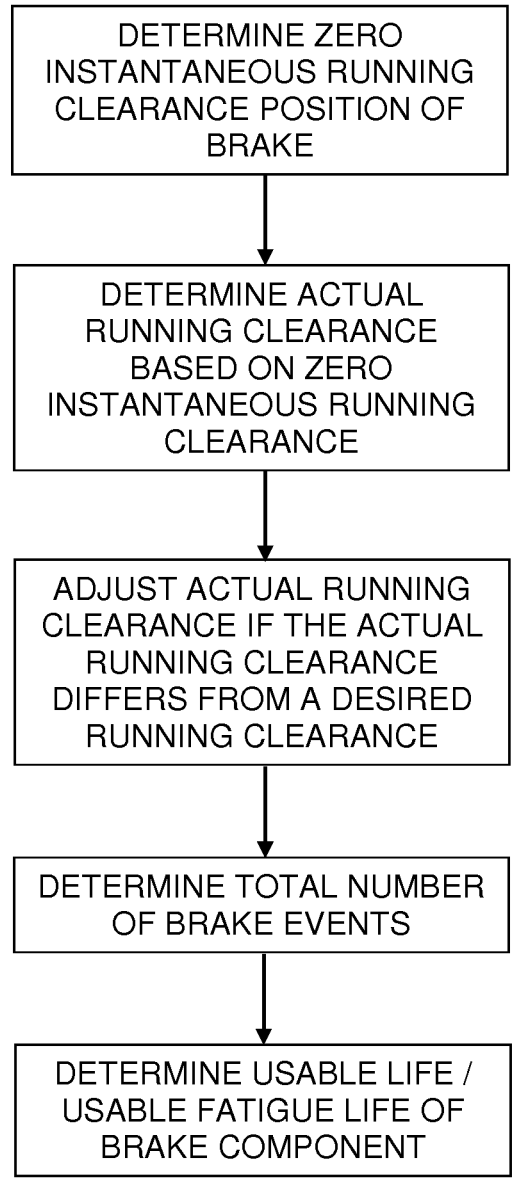
FIG. 5 is a flowchart of a method of determining usable life in a brake component.

FIG. 4 shows a plot of the actuating lever speed of brake 12 plotted against time during an application and release of the brake. The sequence of events that occurs is as follows:

Prior to time T5 the brake is in an off condition.

At time T5 the operator starts to apply brake at a reasonably hard pressure.

The peak in the graph at time T6 is an indication that the brake is near a zero instantaneous running clearance position.

Between time T6 and T7 the brake pressure is maintained at a reasonably hard pressure.

Between time T7 and T8 the brake pressure is progressively increased to a very hard pressure and then progressively decreased to a reasonably hard pressure.

Between time T8 and T9 the brake pressure is gradually increased then relatively quickly decreased.

The trough in the graph at time T9 is an indication that the brake is near a zero instantaneous running clearance position during release.

At time T10 the brake is fully released.

Consideration of the peak at time T6 shows that it is both higher than the peak near time T7 and also it is a relatively sharper peak than the peak near time T7. As a result of previous testing of the brake it can be determined that the characteristic of the peak at time T6 indicates that at time T6 the brake is near a zero running clearance position, whereas the characteristic of the peak near time T7 indicates that at time T7 the brake is not near a zero running clearance position. Furthermore, as a result of the previous testing of the brake, the actual zero running clearance position of the brake relative to the peak at time T6 can be determined.

Consideration of the trough at time T9 shows that it is deeper than the trough at time T8. As a result of previous testing of the brake it can be determined that the trough characteristic shown at T9 is indicative of a zero instantaneous running clearance position whereas the trough near T8 is not indicative of a zero instantaneous running clearance position. Furthermore, as a result of previous testing of the brake, the actual zero running clearance position of the brake can be determined relative to the trough at T9.

Thus, as will be appreciated, it is possible to determine a zero instantaneous running clearance position when the brakes are being applied. It is also possible to determine a zero instantaneous running clearance when the brakes are being released.

FIGS. 2 to 4 show simplified plots for ease of explanation of the general principals of the invention. In practice, as with all measurement techniques, noise is generated and this noise has been filtered out from the plots of FIGS. 2 to 4. Known filtering techniques may be used and the person skilled in the art would readily be able to apply such filtering techniques.

As mentioned above, the characteristic of the measured parameter can be compared with a predetermined characteristic to determine whether or not the measured characteristic is indicative of the zero instantaneous running clearance of the brake. Known comparison techniques may be used. Thus, in respect of a peak such as a velocity peak, the characteristics of a velocity peak may be that the peak must be within a certain aspect ratio (i.e. height of peak -v- width of peak) to be indicative of a zero instantaneous running clearance position of the brake. Alternatively or additionally the peak may have to be above a particular velocity, the peak may have to have occurred within a predetermined time of the brake being initially applied, the gradient of the curve approaching the peak may be within a specific range, the gradient of the curve after the peak may have to be within a specific range, and/or other predetermined characteristics may be chosen.

For ease of explanation, the operating ratio of the operating shaft 26 has been assumed to be 20:1 over the whole of the range of movement of the operating shaft 26. Typically, the operating shaft will not be a constant ratio, rather it will vary depending upon the instantaneous position of the operating shaft.

For ease of explanation, the release running clearance has been described as the sum of the gap between each pad and its associated surface of the brake disc. Under some circumstances a gap can appear between brake pad 20 and that part of caliper 14 which the brake pad engages when the brake is on. Furthermore, a gap can appear between brake pad 22 and that part of the adjuster mechanism 24 which the pad engages when the brake is on. The released running clearance is the sum of gaps G1, G2, any gap existing between pad 20 and caliper 14 and any gap existing between pad 22 and adjuster mechanism 24.

The sensor 40 is a linear sensor. In further embodiments any type of position sensor could be used including rotary sensors. As shown in FIG. 1 the position of the actuating lever 30 is sensed by sensor 40 and in other embodiments any other component of the brake could be sensed. As mentioned above sensor 40 is a position sensor and in other embodiments velocity sensors or accelerometers could be used to sense the velocity or acceleration of any brake component. This is possible since knowing the change of displacement over time allows calculation of velocity and acceleration and similarly knowing the change in speed over time allows calculation of position and acceleration, and similarly knowing change of acceleration over time allows calculation of position and speed.

Different embodiments of brakes will have different characteristics, for example the elasticity of components of one embodiment may be different to the elasticity of equivalent components of a second embodiment. A desired released running clearance of one embodiment may be different to a desired released running clearance of another embodiment. Accordingly, a particular embodiment of a brake may be tested to determine the operating characteristics both during application of the brake and during release of the brake. Testing may be carried out at different application rates and different release rates. Testing may be carried out with different release running clearances. Testing may be carried out at different brake temperatures. Testing may be carried out when the brake is new and also when the brake is old. Once testing has been completed for a particular embodiment, the operating characteristics will be known. It will then be possible to programme processor 42 with certain characteristics (or functions) relating to the tested brake. When the brake is applied sensor 40 send a signal (via line 44) to processor 42, this signal will be compared with the predetermined function to determine the actual released running clearance. Processor 42 can compare the actual released running clearance with the desired released running clearance. Any difference between the actual released running clearance and the desired released running clearance can then be corrected by processor 42 commanding the adjustment of adjuster mechanism 24.

Because each particular embodiment (design) of a brake will have its own particular operating characteristic and in particular its own desired released running clearance, the processor associated with that particular design of brake will be programmed with the characteristics (function) of that design.

Adjuster mechanism 24 may take the form of an extendable piston.

In summary, the system described above with reference to FIGS. 1 to 4 allows determination of the zero instantaneous running clearance positioned.

Once this is known it is possible to determine the actual released running clearance.

Once the actual released running clearance has been determined it can be compared with a desired released running clearance. The comparison can be carried out with a processor for example processor 42.

Once the comparison has been made, it can be determined if there is a requirement to make an adjustment to the actual released running clearance, i.e. if the actual release running clearance is greater than the desired released running clearance then an adjustment can be made to reduce the actual release running clearance, alternatively the actual release running clearance is smaller than the desired released running clearance then adjustment can be made to increase the actual released running clearance.

If there is such a requirement then the actual released running clearance can be adjusted (by operating the electric motor 25) so as to be closer to the desired running clearance.

The system described above with reference to FIGS. 1 to 4 describes an electrically operated clearance control system for maintaining a desired running clearance between the brake disc and the friction surface of a brake pad. The system could equally be applied to maintaining a desired running clearance between a rotor in the form of a brake drum and a friction surface on the associated brake shoe.

Such a system can advantageously be used to determine if there is any usable life remaining in a brake component, thus:

In one embodiment of the present invention the processor 42 "counts" the number of adjustments (brake events) made and by knowing the amount of each adjustment, then the amount of wear on the brake pads can be determined. Thus, each "brake event" is communicated to the processor which in turn increments the count of brake events stored into the memory 46. The processor determines from the count in the memory the amount of wear on the brake pad.

By way of example, consider the situation where new brake pads 20, 22 have been fitted to the brake caliper 14 and the usable thickness T20, T22 of the friction material 20B and 22B is 20 mm. The new pads have been fitted such that the running clearance is correct prior to the first use. For the purpose of explanation it is assumed that processor 42 is arranged such that the electric motor only adjusts the adjuster mechanism 24 in 1 mm increments when a total of 1 mm of wear has occurred to the brake pads, i.e. 0.5 mm of wear has occurred on brake pad 20 and 0.5 mm of wear has occurred on brake pad 22. It will be apparent that once forty adjustments have taken place then the pads will be worn out and will need replacing.

In this example a single adjustment constitutes a "brake event". The processor 42 in conjunction with the memory 46 is configured to recognise that after forty such brake events have occurred after new pads have been fitted, then those pads have no more usable life. Clearly, if less than forty such brake events have occurred after new pads have been fitted then the system is configured to recognise that some usable life remains in the brake pads.

The system can also be configured to recognise how much usable life is left in the brake pads and/or how much usable life has been used. Thus, if twenty such brake events have occurred after new brake pads have been fitted then the pads will be half worn, i.e. half of their usable life has been used and half therefore remains. If thirty such brake events have occurred since new pads have been fitted then the pads are three quarters worn, i.e. 75% of their usable life has been used up and 25% remains.

In the previous example the brake event was defined by an adjustment of a running clearance of the brake. As mentioned above, in one embodiment, prior to the adjustment of the actual release running clearance, there is a determination that such an adjustment is required. Therefore the brake event could be defined by a determination that an adjustment of the running clearance is required (rather than the actual adjustment of the running clearance per se).

As mentioned above, the processor 42 and memory 46 are arranged such that an electric motor adjusts the adjuster mechanism 24 in one mm increments only. In further embodiments adjustment could take place in different discreet steps, i.e. 0.1 mm, 0.5 mm, 1.0 mm, 1.5 mm, 2.0 mm etc increments. Alternatively, adjustment could take place based on the actual wear of the brake pads. For example if after deceleration of the vehicle the total pad wear is 0.01 mm, then an adjustment of this amount could take place. If after a further deceleration of the vehicle 0.37 mm of wear has taken place, then an adjustment of this amount could take place. Under these circumstances, in order to determine if any usable life remains in the brake pads then each brake event can be allocated a value representative of the amount of brake component life used. This would generate a plurality of values as the brake is used and from this plurality of values it would be possible to determine if any usable life remains of the brake component. Thus, take the example above of pads 20, 22 having been fitted to the brake caliper 14 with each brake pad having a usable thickness of friction material of 20 mm. If the first adjustment of the adjuster is 1.0 mm, then this brake event is allocated a value of 1. If the second adjustment is 0.5 mm then this brake event is allocated a value of 0.5. If the third adjustment of the adjuster is 0.23 mm, then this brake event is allocated a value of 0.23. As will be apparent, when the total of the allocated values reaches 40 then there is no more usable life remaining in the brake pads.

As mentioned above, wear increases the actual running clearance and adjustments can be made either in fixed increments, (the example above being 1.0 mm increments) or in different discreet steps (the example above being 0.1 mm, 0.5 mm, 1.0 mm, 1.5 mm and 2.0 mm increments) or an adjustment of the actual pad wear (the example above being 0.01 mm). In all these scenarios wear has caused an increase in the actual running clearance and the adjustment has been to decrease the actual running clearance closer to a desired running clearance. As mentioned above, the actual running clearance can decrease when the brake components heat up due to use. Under these circumstances, because of thermal expansion, it is possible for the actual running clearance to decrease to below the desired running clearance. Under these circumstances it is possible to make an adjustment such that the actual running clearance is increased so as to be closer to the desired running clearance. Clearly, when the brake subsequently cools down, the actual running clearance will be greater than the desired running clearance and a further adjustment will be required to reduce the actual running clearance to closer to the desired running clearance.

As described above, the method was for determining if any usable life remains in a brake pad. A similar method can be used to determine if any usable life remains in a brake shoe.

A similar method can be used to determine if any usable life remains in a brake rotor such as a brake disc or a brake drum. In this regard and considering an example of a brake disc, brake pads typically require replacement before the brake disc has worn out. By way of example, it is assumed that the brake disc outlasts brake pads by a ratio of 3:1, i.e. once three sets of brake pads have worn out, then this is an indication that the brake disc itself will be worn to a point where it needs replacement. Thus, using the example above with regard to the allocation of a value to a brake event, when the total of the plurality of values reaches 120 (i.e. 3×40), then this is an indication that the brake disc requires replacement.

A similar approach can be used for brake drums.

As will be appreciated, the electrically operated clearance control system is able to perform two functions, firstly it is able to maintain a desired running clearance between the rotor and a friction surface of the brake pad or brake shoe. Secondly, it is able to act as a wear indicator. As such the requirement for a separate wear indicator is no longer required and accordingly the cost and space requirement of such a separate mechanical or electro mechanical wear indicator are no longer incurred.

The system has been described with respect to the electrically operated clearance control system as shown in FIGS. 1 to 4 which monitors a single parameter of a brake component in order to determine the zero instantaneous running clearance position and from that ultimately determine when the running clearance is to be adjusted, and from that determine when the brake pads require replacing. It will be appreciated, any prior art electrically operated clearance control system could be used to determine if any usable life remains in a brake component, such as a brake pad, a brake shoe, a brake disc, a brake drum etc.

Furthermore, it is not necessary to have any electrically operated clearance control system. Provided a total number of brake events can be determined, then the processor can determine if any usable life remains in a brake component without the need for any electrically (or mechanically) operated clearance control system.

The present invention is also capable of determining if any usable fatigue lift remains in a brake component. By way of example, consider the actuating lever 30. It is assumed that actuating lever 30 has a fatigue limit. Throughout the life of the vehicle 10 the brake 12 will be applied typically many hundreds of thousands of times. Each application and release of the brake constitutes one fatigue cycle and in particular for the present example one fatigue cycle of actuating lever 30.

In one example of the present invention the processor 42 in conjunction with memory 46 "counts" the number of fatigue cycles. Thus, the processor could count the number of times the brake is applied, this being a good indication of a fatigue cycle, i.e. an application and release of the brake.

Test results may have previously determined the amount of fatigue life an average fatigue cycle uses up. Thus by counting the number of fatigue cycles and assuming they are all average fatigue cycles then it is possible to determine whether a particular component has any remaining fatigue life. By way of example, if an average fatigue cycle uses up 1×10−6 of the fatigue life of the actuating lever 30, then once a million fatigue cycles have occurred then actuating lever 30 is in need of replacement. In this example a single brake application constitutes a "brake event". The processor 42 is configured to recognise that after one million such brake events have occurred in respect of the actuating lever 30 that actuating lever has no more usable life. Clearly if less than one million such brake events have occurred then the system is configured to recognise that some usable life remains in the actuating lever 30.

The system can also be configured to recognise how much usable life is left in the actuating lever 30 and/or how much usable life has been used.

In the previous example, the brake event was defined by an actuation of the brake. Alternatively the processor 42 could count the number of times the brake is released (this also being a good indication of a fatigue cycle, i.e. an application and release of the brake).

In a further embodiment it is possible to be more refined in respect of the amount of fatigue life used during a particular brake application. Thus, the sensor 40 can measure how far the actuating lever 30 rotates during each application. A relatively small rotation of the actuating lever 30 (say less than 10°) indicates that the brake has been applied relatively lightly and little fatigue damage (if any) has been done to the actuating lever 30. Conversely, a large angular rotation of actuating lever 30, say 45° indicates that a large force has been applied to the actuating lever and relatively more fatigue damage has been done. Under these circumstances, in order to determine if any usable life remains in the actuating lever 30, each brake event can be allocated a value representative of the amount of brake component life used. Table 1 below shows particular brake events in respect of the angular rotation of the actuating lever from the rest position to an actuating position and the associated value. Thus, if the brake is applied and the actuating lever rotates through 7° and the brake is then released and the actuating lever returns to its rest position such a brake event would be allocated a value of 0 because the fatigue life used during this event would be 0 or negligible. When the brake is applied and the actuating lever rotates through 15° and the brake is then released so the actuating lever returns to its rest position. These brake events are allocated a total value of 0+1=1 because the brakes have been applied relatively lightly and a relatively small amount of fatigue life has been used. When the brake is applied in the actuating lever rotates through 35° and then returns to the rest position such brake events are allocated a total value of 0+1+ 6+12=19 since a relatively larger amount of fatigue life has been used during this application and release of the brake. In this example a value of 1 indicates that one millionth of the fatigue life has been used up, a value of 6 indicates that six millionths of the fatigue life has been used up etc. Thus when the total of the values reaches 1 million then the actuating lever 30 requires replacement. In further examples an average fatigue angle may use up more or less than 1×10−6 of the fatigue life of the actuating lever.

During operation of the brake, the operator may vary the foot pedal effort during the braking process. An example where the pedal effort is varied such that at the start of the braking the actuating lever moves (taking the rest position as zero) to a 5° position and remains there for a short period, then moves a further 10° to a 15° position and remains there for a short period, then moves a further 20° to a 35° position, then moves back 10° to a 25° position, then moves forwards to a 35° position, then returns to rest. Because the brake has been applied and partially released then reapplied, more fatigue life has been used than if the brake was simply to have been applied then released. In this example, the total value during this brake application release would be 0+1+6+12+12, i.e. a total of 31. Contrast this with the situation where the brake is applied such that the actuating lever 30 moves from the rest position to a 35° and then back to the rest position. Under these circumstances the fatigue views would be 0+1+6+12, i.e. a total 19.

In the above example, the fatigue event was defined by an application of the brake above a predetermined limit, in this case the limit was defined by an angular rotation of the actuating lever. In further examples the predetermined limit may be a predetermined brake clamp force, for example a force applied by roller 28 to the adjuster mechanism 24, alternatively the force applied by the actuator rod 34 to the end 30A of the actuating lever 30. In a further embodiment the predetermined limit may be defined by a retardation or deceleration of the vehicle 10. In a further embodiment a predetermined limit may be defined by brake pedal effort applied by the operator.

As described above the brake event is defined by an application of the brake but the brake event could equally be defined by a release of the brake. In particular the brake event may be defined be the release of a brake from above a predetermined limit to below a predetermined limit. For example, the brake event could be defined by releasing the brake from a position when the actuator lever is over 30° from its rest position to a position where the actuator lever is below 30°, in which case an allocated value of 12 may be allocated. Similarly the predetermined limit may be defined in terms of brake clamp force or a retardation (deceleration) of the vehicle 10 or by release of the brake pedal from above a predetermined limit to below a predetermined limit.

TABLE 1

| Brake Event | Value |
|---|---|
| rotation of actuating lever less than 10° | 0 |
| rotation of actuating lever past 10° in an actuating direction | 1 |
| rotation of actuating lever past 20° in an actuating direction | 6 |
| rotation of actuating lever past 30° in an actuating direction | 12 |
| rotation of actuating lever past 40° in an actuating direction | 24 |

As shown in table 1, and for ease of explanation, the brake events have been set at round number of degrees of lever rotation (i.e. 10 degrees, 20 degrees, 30 degrees and 40 degrees). In this case 5 events have been set, each being allocated different values. In further embodiments a different number of events (either greater than or less than 5) could be set and the angles associated with those brake events could be different. In particular, rotation of an actuating lever less than 20 degrees may be allocated a value of zero.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of determining if any usable life remains in a brake component of a brake, the method comprising the steps of:

determining a zero instantaneous running clearance position of the brake by:
  monitoring a single parameter of the brake component during actuation of the brake, and
  determining a position of the brake when the single parameter has a monitored characteristic that is indicative of the zero instantaneous running clearance position by comparing the monitored characteristic of the single parameter with a predetermined characteristic of the single parameter that is known to be indicative of the zero instantaneous running clearance position of the brake;
the method further including the steps of:
using a processor to determine a total number of brake events, wherein a brake event is defined by an adjustment of a running clearance of the brake or a determination that an adjustment of the running clearance of the brake is required, and
using the processor to determine from the total number of brake events if any usable life remains in the brake component.

2. The method as defined in claim 1 further comprising the steps of providing an actuator that is operable to apply the brake, and providing an adjuster mechanism that is operable to adjust the running clearance of the brake.

3. The method as defined in claim 2 wherein the actuator is a mechanically operated actuator.

4. The method as defined in claim 3 wherein the adjuster mechanism is electrically operated.

5. The method as defined in claim 1 wherein the brake component is a brake pad, a brake shoe, a brake disc or a brake drum.

6. The method as defined in claim 1 including the step of allocating to each brake event a value representative of an amount of brake component life used to provide a plurality of values and determining from the plurality of values if any usable life remains in the brake component.

7. The method as defined in claim 1 including determining from the total number of brake events one of how much usable life remains in the brake component and how much usable life of the brake component has been used.

8. The method as defined in claim 1 including using the processor to compare the monitored characteristic of the single parameter with the predetermined characteristic of the single parameter.

9. The method as defined in claim 1 including the step of adjusting an actual running clearance of the brake by:
  determining from the zero instantaneous running clearance position of the brake an actual running clearance of the brake,
  providing a desired running clearance of the brake, and
  adjusting the brake such that a subsequent actual running clearance of the brake is nearer the desired running clearance of the brake.

10. The method of claim 9 wherein the actual running clearance is less than the desired running clearance and the subsequent actual running clearance is greater than the actual running clearance.

11. The method of claim 1 wherein the single parameter is an actuating lever position of an actuating lever that actuates an adjuster mechanism that adjusts the running clearance of the brake.

12. A method of determining if any usable life remains in a brake component of a brake, the method comprising the steps of:
  determining a zero instantaneous running clearance position of the brake by:
  monitoring a single parameter of the brake component during actuation of the brake, and
  determining a position of the brake when the single parameter has a monitored characteristic that is indicative of the zero instantaneous running clearance position by comparing the monitored characteristic of the single parameter with a predetermined characteristic of the single parameter that is known to be indicative of a zero instantaneous running clearance position of the brake;
the method further including the steps of:
using a processor to determine a total number of brake events, and
using the processor to determine from the total number of brake events if any usable fatigue life remains in the brake component.

13. The method as defined in claim 12 further comprising the steps of providing an actuator that is operable to apply the brake, and providing an adjuster mechanism that is operable to adjust a running clearance of the brake.

14. The method as defined in claim 13 wherein the actuator is a mechanically operated actuator.

15. The method as defined in claim 14 wherein the adjuster mechanism is electrically operated.

16. The method as defined in claim 12 wherein a brake event is defined by an application of the brake.

17. The method as defined in claim 16 wherein the brake event is defined by an application of the brake above a predetermined limit.

18. The method as defined in claim 12 wherein a brake event is defined by a release of the brake.

19. The method as defined in claim 12 including using the processor to compare the monitored characteristic of the single parameter with the predetermined characteristic of the single parameter.

20. The method as defined in claim 12 including the step of adjusting an actual running clearance of the brake by:
  determining from the zero instantaneous running clearance position of the brake an actual running clearance of the brake,
  providing a desired running clearance of the brake, and
  adjusting the brake such that a subsequent actual running clearance of the brake is nearer the desired running clearance of the brake.

21. The method of claim 20 wherein the actual running clearance is less than the desired running clearance and the subsequent actual running clearance is greater than the actual running clearance.

22. The method of claim 12 wherein the single parameter is an actuating lever position of an actuating lever that actuates an adjuster mechanism that adjusts the running clearance of the brake.

* * * * *